9592X
L. Lyon, 2d
Felting Machine.
No. Patented April 13, 1836.
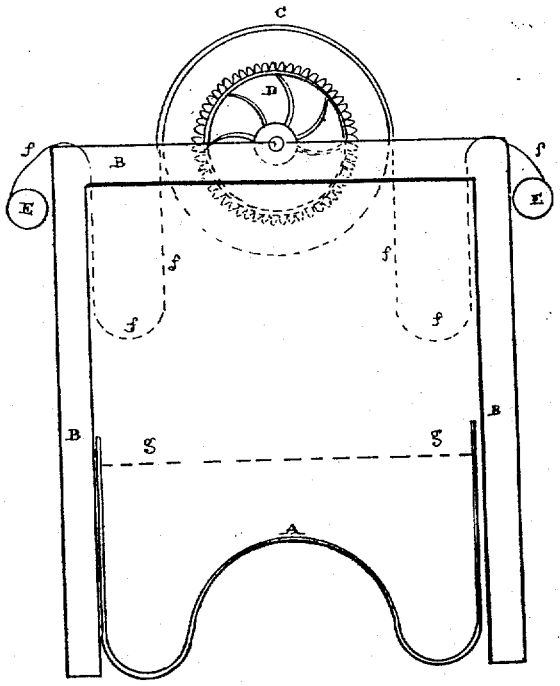

Samuel Lyon 2nd Needham Mass.

Letters Patent.

The Schedule referred to in these Letters Patent and making part of the same, containing a description in the words of the said Samuel Lyon 2nd of his improvement in the mode of Planking & Napping Hats."

To all to whom these presents shall come

– Be it known, that I Samuel Lyon 2nd of Needham in the County of Norfolk & Commonwealth of Massachusetts have invented a new and useful improvement in the mode of planking and napping hats, & that the following is a full & exact description of said mode and of the operation of the machinery therefor as invented by me.

The letter A in the drawing hereto annexed represents an end view of a kettle composed of copper or other suitable metal, set in bricks over a fire in the customary manner, said kettle should be about two feet in width, one foot in height and of any convenient length from five to ten feet or more. A wooden frame or box is placed upon the kettle of the same width & length, so that it is only an increase of the height of the kettle, making it in the whole about two feet high. A cylinder of about fifteen inches diameter is placed longitudinally in this frame box or kettle, the gudgeons of which rest upon the ends of said frame box or kettle, in the drawing, this frame or box is represented by B.B.B. and the cylinder by C. between the cylinder and the sides of the frame or box there is a space of about four or five inches, and the cylinder an apron of any coarse cloth is laid; and the middle of the cloth being nailed or fastened to the upper side of the cylinder, at C, the two ends of the apron represented by f f f f. go down into the box or kettle and are then carried up over the sides and are rolled or wound round the rollers d.d. when it is desired that the apron shall descend far down into the kettle, the ends may be unwound from

9592X from the rollers. & when it is desired to let it fall a less distance into the kettle, the ends of the apron may again be rolled up round E.E. This apron is then covered at the bottom with hat bodies, if for planking two or three layers deep; if for napping then only two layers deep. The cylinder is put in motion by a crank motion or in any other way. D. represents a cog wheel or pinion by which the cylinder is turned. The point of the circumference at C descends until it has performed nearly half a revolution; it is then arrested, carried back and over on the other side until it makes nearly half a revolution on that side, and is then arrested and carried back and down again as before. As the cylinder moves the lower point in the apron necessarily descends on one side and rises on the other. Whether the apron is rising or descending, the hat bodies, which lie in its bed or trough, receive a rotary motion. As the apron rises, they roll in one direction; as it descends they roll in the contrary direction.

In planking the bodies, the apron should move only in steam, & for that purpose the ends may be taken up round the rollers E.E. In napping them the apron should descend into the water. The hats should be prepared for napping as that, if they were to be napped in the ordinary way. G.G. represents the water line, tho' the kettle may contain more or less water according to circumstances. A cover should be put over the whole machine to prevent the steam & heat from escaping. It is obvious also that a kettle of different dimensions may be constructed. If the diameter of the cylinder is greater, the box or kettle should be wider. The same rotary and alternating motion in rolling & their shifting from forwards to backwards may be given to hat bodies, by placing them in the inside of a cylinder and then giving the cylinder the alternating or shifting motion above described. In such cases the cylinder should allow of the admission of steam or water. I consider the apron preferable [illegible] [illegible] What I claim as

9592X as my invention or improvement in planking and nailing hat-bodies & for which I herein claim Letters Patent is the giving a rotary & alternating motion, i.e. rotary & then shifting from forwards to backwards, to hat-bodies placed in the bed or trough of fan-shape or inside of a cylinder as above described.

Witnesses
Thomas Shann
John Cockburn

Samuel Lyon Esq.
Ch. Jill

Sd. Hd.